July 3, 1934.                   W. TINLIN                    1,965,013
                               RIVET RULE
                          Filed Sept. 18, 1931
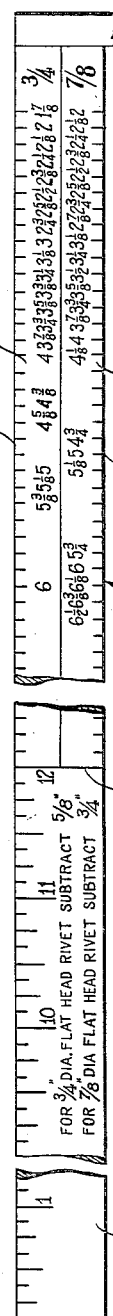
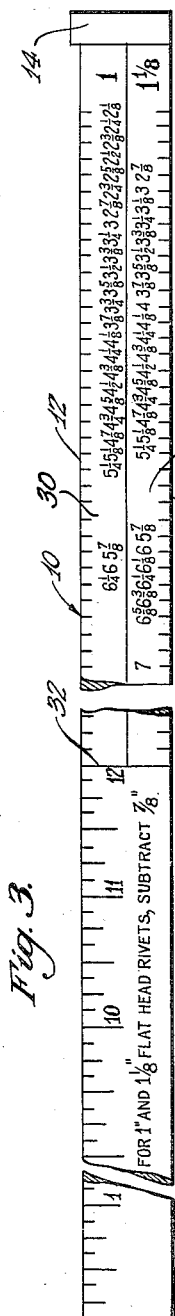
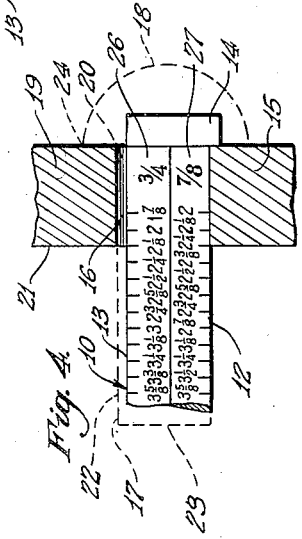
William Tinlin.
INVENTOR
Victor J. Evans & Co.
HIS ATTORNEYS Patented July 3, 1934

1,965,013

UNITED STATES PATENT OFFICE 1,965,013

RIVET RULE

William Tinlin, Chicago, Ill.

Application September 18, 1931, Serial No. 563,626

2 Claims. (Cl. 33—111)

This invention relates to certain novel improvements in rivet rules, and has for an object thereof the provision of an improved construction of this character which will be highly efficient in use and economical in manufacture.

Rivets, such as used, for example on boilers, structural steel work, etc., consist, in blank form of three parts, namely, the head, the grip or that portion which, when the rivet is driven into place, lies within the aperture through which the rivet penetrates, and the stock, or that part of the rivet from which a clinching head or button is formed when the heated rivet is driven into place. When the heated rivet is driven into place to secure two plates, for example, together, pressure is applied to the heated rivet blank to form the clinching head. Experience in the art teaches that when pressure is applied to the heated rivet blank the grip portion of the rivet shrinks or contracts, and frequently this contraction is so considerable that insufficient stock is left to form a clinching head that will pass inspection, resulting in an imperfect head being formed on the rivet with the result that the rivet must be cut out and replaced, which is costly in point of time and labor. As now practised in the art determination of the overall length of the rivet that should be employed for an aperture of a given length, to allow for the grip, stock and shrinkage, is a matter of guess by the workman. It is an object of this invention, therefore, to provide a rule by the use of which the workman may readily measure, for a given diameter of rivet, the overall length of blank rivet that should be employed in a hole or aperture of a given length, to allow for the grip, shrinkage, and enough stock to form a perfect head when the rivet is driven into place.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is an elevational view of one side of a preferred form of construction of my improved rule;

Fig. 2 is a sectional view of the rule shown in Fig. 1;

Fig. 3 is an elevational view of the side of the rule opposite that shown in Fig. 1; and Fig. 4 is a view, partly in section and partly in elevation, showing the manner of using the rule.

Referring to the drawing, wherein a preferred and practical embodiment of the invention is illustrated, 10 indicates generally my improved rule which, in the present instance, comprises an elongated single strip of material 11 having parallel longitudinal edges 12 and 13. I have shown the rule as being made of a single strip of material though it is to be understood that it may be made in hinged sections, if desired, without departing from the scope of the invention. At one end of the rule 10 I provide a portion 14 which projects beyond the edge 12, for a reason to be made apparent presently.

In Fig. 4 a steel plate or the like is indicated at 15, for the purpose of explaining the manner of using the rule, and extending through this plate is a hole or aperture 16 into which a rivet, indicated in dotted lines, at 17 is to be driven. The rivet includes the pre-formed head 18 that will be abutted against the face 19 of the plate 15 when the rivet is driven, the grip or that portion 20 which is to lie within the aperture 16 between the faces 19 and 21 of the plate 15, and the stock or that portion 22 which projects beyond the face 21 and from which a head, that may be similar to the head 18, will be formed when the rivet is heated and pressure is applied to the stock 22. The overall length of the rivet is the distance between the inner end 24 of the head 18 and the end 23 of the stock.

On one face 25 (Fig. 1) of the rule I provide two parallel rows 26 and 27 of figures. At the end of one of these rows is the fraction ¾, which refers to the diameter in inches of the rivet, the overall length of which is to be measured in a manner to be explained presently. The row 27 has at one end the fraction ⅞, referring to the diameter in inches of the rivet. From the end 28 of these rows 26 and 27 to the end 29 of the rule I provide an ordinary inch rule and on which certain information is inscribed for reasons to be made apparent presently. On the opposite face of the rule (Fig. 3) I provide two rows 30 and 31 of figures. At one end of the row 30 is the designation 1″, referring to rivet diameter and at one end of the row 31 is the designation 1⅛″, referring to rivet diameter. Between the end 32 of the rows 30 and 31 and the end 29 of the rule I provide an ordinary inch rule on which is inscribed certain information to be referred to hereinafter.

The diameter of the aperture 16 is generally determined, by experienced riveters, merely by glancing at the aperture. It will be assumed, for example, that the diameter of the aperture 16 and likewise of the rivet to be used therein, is ¾". The rule will then be inserted through the aperture 16 and the projecting portion 14 snubbed up against the face 19 of the plate 15, as in Fig. 4. The user will then run his thumb over the edge 13 of the rule until the thumb strikes the face 21 of the plate and he will then note the point on the row 26 that is aligned with the face 21. This may be done by keeping the thumb nail at this point. The rule is then withdrawn from the aperture 16 and the numeral in row 26 marked by the thumb nail determined. As illustrated in Fig. 4, this numeral is 2⅛" which signifies that if the aperture 16 takes a ¾" diameter rivet the overall length of the blank rivet, that is the distance between the inner end 24 of the head 18 and the end 23 of the rivet, should be 2⅛" to allow for sufficient grip, sufficient stock to make a head similar to 18 on the side 21 of the plate, and to allow for shrinkage as the heated rivet is driven into place in the aperture 16.

For ⅞" diameter rivets the user will run his thumb along edge 12 to face 21 of the plate 15, while row 30 will be used for 1" diameter rivets and row 31 for 1⅛" diameter rivets, these four diameters of rivets being those most commonly used.

The inch rule on both sides of the rule 10 is used to measure the overall length of the rivet after the same has been determined, in the manner explained above.

When a flat head rivet is to be formed from the stock portion 22 of the rivet, ⅝" is subtracted from the overall length of ¾" diameter rivets, as directed on the rule face shown in Fig. 1, while ¾" is subtracted from the overall length of ⅞" diameter rivets. For 1" and 1⅛" diameter rivets, ⅞" is subtracted from the overall length if a flat head is to be formed from the stock portion 22. These values have been determined from experience and experiment in the art.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A rule for determining the overall length of a rivet blank required to make a proper rivet for an aperture in an object in which the blank is to be disposed to form the rivet, comprising an elongated member having a longitudinal edge, said member having a face and said face having arranged thereon along said edge a row of numerals, said numerals representing the required overall rivet lengths for rivets of a certain diameter and including allowance for shrinkage of the grip and stock portions of the blank when heated and formed under pressure, and a portion projecting beyond said edge at one end of the rule adapted to be engaged against one surface of the object through which said aperture extends when the rule is inserted through the aperture, whereupon the numeral in said row that is then aligned with the other side of the object at the opposite end of the aperture will indicate the overall length of the rivet blank needed for the aperture.

2. A rule for determining the overall length of a rivet blank required to make a proper rivet for an aperture in an object in which the blank is to be disposed to form the rivet, comprising a member having a longitudinal edge, said member having a face and said face having arranged thereon along said edge a row of numerals, said numerals representing the required overall lengths for rivets of a certain diameter and including allowance for shrinkage of the grip and stock portions of the blank when heated and formed under pressure, said member being adapted to be inserted through said aperture and one end thereof aligned with one side of the object at the end of said aperture whereupon the numeral in said row that is then aligned with the other side of the object at the opposite end of said aperture will indicate the overall length of the rivet blank needed for said aperture.

WILLIAM TINLIN.